United States Patent
Fleury et al.

(10) Patent No.: US 6,579,837 B1
(45) Date of Patent: Jun. 17, 2003

(54) TEREPHTHALIC POLYESTER COMPOSITION AND ITS USE AS SOIL RELEASE AGENT

(75) Inventors: Etienne Fleury, Irigny (FR); Véronique Bossennec, Serezin-Du-Rhone (FR); Jacques Dubois, Vienne (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/743,383

(22) PCT Filed: Jul. 9, 1999

(86) PCT No.: PCT/FR99/01691
§ 371 (c)(1),
(2), (4) Date: Jan. 9, 2001

(87) PCT Pub. No.: WO00/04120
PCT Pub. Date: Jan. 27, 2000

(30) Foreign Application Priority Data

Jul. 15, 1998 (FR) ............................................. 98 09042

(51) Int. Cl.⁷ ......................... C08G 65/32; C08L 67/02; C11D 1/76
(52) U.S. Cl. ...................... 510/299; 510/528; 525/437; 525/444; 528/300; 8/115.56
(58) Field of Search .................. 525/437, 444; 528/300; 510/299, 528; 8/115.56

(56) References Cited

U.S. PATENT DOCUMENTS

| | | | | |
|---|---|---|---|---|
| 3,981,931 A | * | 9/1976 | Smith ..................... | 252/174.14 |
| 4,116,885 A | | 9/1978 | Derstadt et al. ............ | 252/532 |
| 4,785,060 A | | 11/1988 | Nagler ....................... | 525/444 |
| 4,999,128 A | * | 3/1991 | Sonenstein ............... | 252/174.4 |
| 5,474,854 A | * | 12/1995 | Kagami et al. ............. | 428/482 |
| 5,858,551 A | * | 1/1999 | Salsman ..................... | 428/480 |

FOREIGN PATENT DOCUMENTS

| | | | | |
|---|---|---|---|---|
| DE | 2 129 993 | 12/1971 | ......... | C08G/17/003 |
| DE | 25 10 509 | 9/1975 | ........... | C07C/31/18 |

OTHER PUBLICATIONS

Database WPI Section Ch, Week 8509, Derwent Publications Ltd., London, GB; AN 85–052388, XP–002099902 and JP 60 008333 A (MTP Chem Co Ltd).

* cited by examiner

Primary Examiner—Patricia A. Short

(57) ABSTRACT

The invention concerns a terephthalic polyester composition (CPT), comprising in mixture: an ethyleneterephthalate homooligomer (PET 1) essentially containing recurrent terephthalate oxyethylene (TE) units; and a block terephthalate copolymer (PET 2/TE-POE) containing at least a polyethyleneterephthalate (PET 2) sequence; and at least a terephthalate polyoxyethylene (TE-POE) sequence whereof the POE unit has a molecular mass of 1500 to 4000 in number; said composition (CPT) being characterised in that: the quantity of (TE) units of (PET 1) represents not more than 10% of the total number of (TE) units present in said composition (CPT); the weight quantity of (TE) units present in the composition (CPT) represents at least 10% of (TE) units present in the composition (CPT); the quantity by weight of mono(oxyethyleneoxy) radicals (OEO) represents at least 1.3% of the weight of the composition (CPT), said radicals (OEO) belonging to the aromatic diester oxyethylene groups (ODA) of formula: —A—C(O)—O—CH2—CH2—O—C(O)—A— present in all the (PET 1) and (PET 2) sequences; and the molar mass by weight of block terephthalic copolymer (PET 2/TE-POE) is at least 30000. The invention also concerns the use of said composition as soil release agent in detergent formulations for washing textiles.

17 Claims, 2 Drawing Sheets

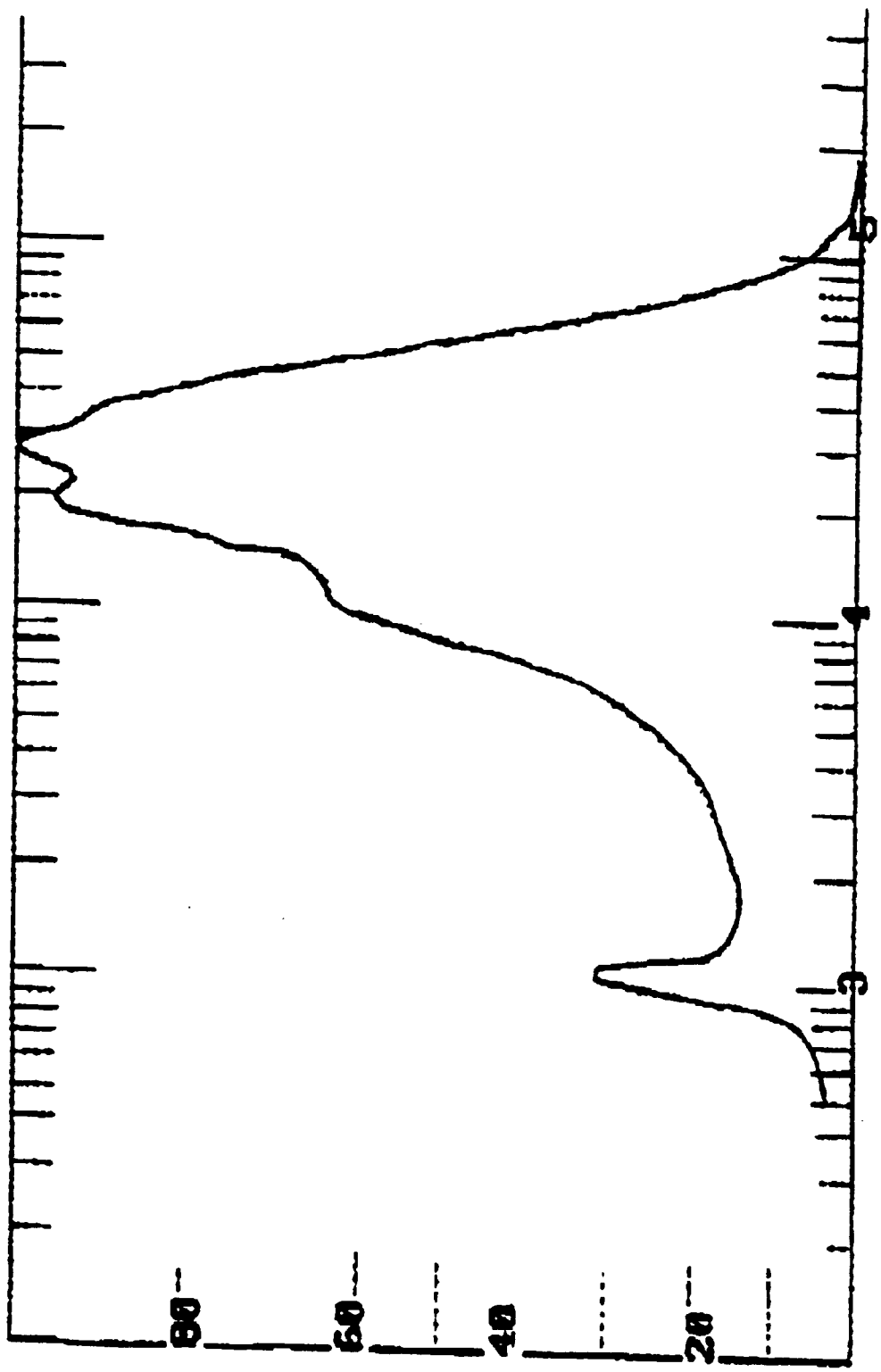
Figure 1/2

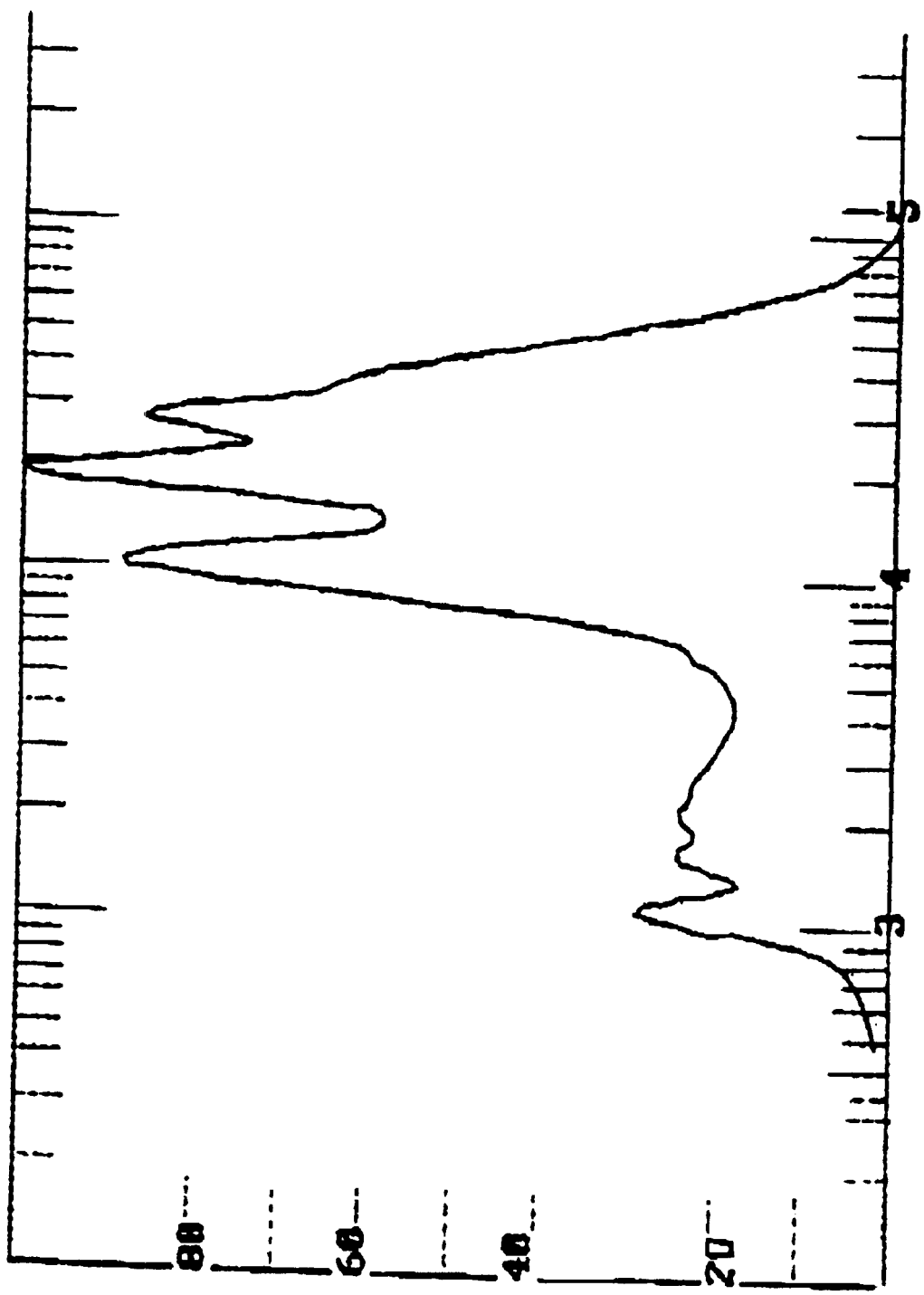
Figure 2/2

TEREPHTHALIC POLYESTER COMPOSITION AND ITS USE AS SOIL RELEASE AGENT

This application is an application under 35 U.S.C. Section 371 of International Application Number PCT/FR991/01691 filed on Jul. 9, 1999.

A subject matter of the present invention is a novel terephthalic polyester composition, its process of preparation by transesterification/condensation of poly(ethylene terephthalate) and of polyethylene glycol, and its use as soil-release agent in detergent formulations, in rinsing, softening or finishing formulations, for the washing, with or without pretreatment, the rinsing, the softening or the finishing of textiles, in particular polyester-based textiles.

The soil-release activity of ethylene terephthalate/polyethylene oxide terephthalate copolymers in the finishing of textiles, in particular polyester-based textiles, and the use of said copolymers as soil-release and/or antiredeposition agents in detergent formulations for the washing, with or without pretreatment, of textiles, in particular polyester-based textiles, are well known (U.S. Pat. Nos. 396,252; 4,116,885; 4,785,060).

These copolymers can, for example, derive from the transesterification/condensation of poly(ethylene terephthalate) and of polyethylene glycol (U.S. Pat. No. 4,785,060).

The Applicant Company has found a novel terephthalic polyester composition which can be obtained by transesterification/condensation of a poly(ethylene terephthalate) and of a polyethylene glycol and which in particular exhibits particularly good soil-release properties.

According to the invention, it is a terephthalic polyester composition (TPC) comprising, as a mixture an ethylene terephthalate homooligomer $(PET_1)$ essentially comprising oxyethylene terephthalate (TE) repeat units of formula (I)

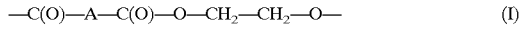
$$-C(O)-A-C(O)-O-CH_2-CH_2-O- \quad (I)$$

where A represents the 1,4-phenylene group, and a block terephthalic copolymer $(PET_2/TE\text{-}POE)$ comprising at least one polyethylene terephthalate block $(PET_2)$ composed of oxyethylene terephthalate (TE) repeat units of formula (I)

$$-C(O)-A-C(O)-O-CH_2-CH_2-O- \quad (I)$$

where A represents the 1,4-phenylene group,
and at least one polyoxyethylene terephthalate block (TE-POE) of formula

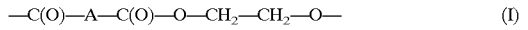
$$-C(O)-A-C(O)-O-CH_2-CH_2-O-(CH_2-CH_2-O)_n-$$

the value of n being such that said block exhibits a number-average molecular mass of the order of 1500 to 4000, preferably of the order of 3000 to 4000, said composition being characterized in that:
the amount of (TE) units of the polyethylene terephthalate $(PET_1)$ does not represent more than 10%, preferably not more than 7%, of all the (TE) units present in the terephthalic polyester composition (TPC), the amount by weight of all the (TE) units present in said (TPC) composition represents at least 11%, preferably from 11.5 to 17%, of the weight of said (TPC) composition, the amount by weight of mono(oxyethyleneoxy) (OEO) residues of formula

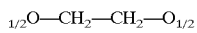
$$_{1/2}O-CH_2-CH_2-O_{1/2}$$

represents at least 1.3%, preferably from 1.3 to 2.3%, of the weight of said terephthalic polyester composition (TPC), said (OEO) residues belonging to the oxyethylene aromatic diester (OAD) groups of formula

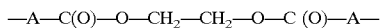
$$-A-C(O)-O-CH_2-CH_2-O-C(O)-A-$$

present in all the $(PET_1)$ and $(PET_2)$ blocks, and in that the weight-average molar mass of said block terephthalic copolymer $(PET_2/TE\text{-}POE)$ is at least 30000, preferably at least 35000, very particularly at least 40000.

The ends of the chains of $(PET_1)$ homooligomers are generally composed of $-C(O)-A-C(O)-O-CH_2-CH_2-OH$ units.

The ends of the chains of block terephthalic copolymer $(PET_2/TE\text{-}POE)$ are generally composed of

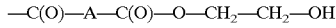
$$-C(O)-A-C(O)-O-CH_2-CH_2-OH$$

units and/or

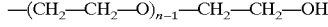
$$-(CH_2-CH_2-O)_{n-1}-CH_2-CH_2-OH$$

units.

The characteristics of the (TPC) composition of the invention can be determined by subjecting said composition to the following analyses:

size exclusion chromatography (SEC) using a size exclusion chromatography device with simultaneous detection by refractometry and ultraviolet, using N,N-dimethylacetamide (DMAc) comprising $10^{-2}$ mol/l of LiBr as eluent at 100° C.

This measurement (UV chromatography) makes it possible:
to detect the presence of the A (terephthalic) aromatic nuclei,
to determine the percentage of ethylene terephthalate homooligomer $(PET_1)$ in the terephthalic polyester composition (TPC),
to determine the weight-average molar mass of the block terephthalic copolymer $(PET_2/TE\text{-}POE)$, expressed in polystyrene equivalents.

proton nuclear magnetic resonance ($^1$H NMR) using an NMR spectrometer in a $CDCl_3$/deuterated hexafluoroisopropanol/deuterated trifluoroacetic anhydride mixture.

This measurement makes it possible to detect
the aromatic (terephthalic T) nuclei,
the oxyethylene units,
the mono(oxyethyleneoxy) (OEO) residues present in the oxyethylene aromatic diester (OAD) groups,
the polyoxyethylene terephthalate blocks (TE-POE), the units at the chain ends.

The calculation makes it possible to deduce therefrom:
the amount by weight of all the (TE) units in the terephthalic polyester composition (TPC),
the amount by weight of mono(oxyethyleneoxy) (OEO) residues in the terephthalic polyester composition (TPC).

Further information with regard to these analyses is given in the examples.

BRIEF DESCRIPTION OF THE DRAWINGS

FIG. 1 is the size exclusive chromatography spectrum of the terephthalic polyester composition obtained in example 1 herein below; and FIG. 2 is the size exclusive chromatography spectrum of the terephthalic polyester composition obtained in comparative example 2 herein below.

Said terephthalic polyester composition forming the subject matter of the invention can be obtained by a transesterification/condensation reaction of a polyethylene terephthalate with a weight-average molecular mass of the order of 5000 to 100000, preferably of the order of 10000 to 80000, and a polyethylene glycol with a number-average molecular mass of the order of 1500 to 4000, preferably of the order of 3000 to 4000, according to a polyethylene terephthalate/(polyethylene terephthalate+polyethylene glycol) ratio by mass of the order of 11/100 to 17/100,+ preferably of the order of 11.5/100 to 17/100, in the presence of an effective amount of condensation catalyst.

Said polycondensation operation being characterized in that said catalyst is composed of magnesium oxide, in that, after addition of the polyethylene terephthalate to the molten polyethylene glycol, heating the reaction mixture under an inert atmosphere to a temperature of the order of 100 to 150° C., preferably of the order of 120 to 130° C., the catalyst composed of magnesium oxide is introduced, in that the temperature of the mixture is brought to a temperature of the order of 250 to 290° C., preferably of the order of 270 to 285° C., and in that said reaction mixture is subsequently gradually placed under vacuum to a pressure of less than 70000 Pa, preferably of the order of 7000 to 130 Pa, while optionally adjusting the temperature to a value of the order of 250 to 290° C., preferably of the order of 270 to 285° C.

These temperature and pressure conditions can be maintained for 1 to 5 hours approximately, depending upon the equipment used.

The polyethylene terephthalates which can be employed are in particular commercial products obtained by polycondensation of dimethyl terephthalate and of ethylene glycol.

The amounts of magnesium oxide employed can be of the order of 20 to 500 ppm, preferably of the order of 100 to 350 ppm.

The reaction mixture can additionally comprise an alkali metal organic salt, in particular an alkali metal acetate, such as sodium acetate. Said salt can be present according to amounts of the order of 20 to 500 ppm, preferably of the order of 100 to 350 ppm.

The terephthalic polyester composition forming the subject matter of the invention is very particularly advantageous as soil-release agent in detergent formulations, in rinsing, softening or finishing formulations, for the washing, with or without pretreatment, the rinsing, the softening or the finishing of textiles, in particular polyester-based textiles.

Another subject matter of the present invention is detergent formulations including of the order of 0.01 to 10%, preferably of the order of 0.1% to 5% and very particularly of the order of 0.2 to 3%, with respect to the weight of said formulations, of said terephthalic polyester composition forming the subject matter of the invention.

Another subject matter of the invention is the use of said terephthalic polyester composition as soil-release agent in detergent formulations for the washing of textile articles, in particular textile articles based on polyester fibers.

Detergent formulations for the washing of textile articles, in particular textile articles based on polyester fibers, which are particularly advantageous with regard to their ecotoxicological properties, are those including:

of the order of 0.01 to 10% by weight, preferably of the order of 0.1 to 5% by weight, very particularly of the order of 0.2 to 3% by weight, of the soil-release terephthalic polyester composition (TPC) described above, and of the order of 3 to 40% by weight, preferably of the order of 5 to 35% by weight, of at least one anionic surface-active agent chosen from sulfates of saturated aliphatic $C_5$–$C_{24}$ alcohols, optionally condensed with approximately 0.5 to 30 mol of ethylene oxide, not more than 5% by weight of said detergent formulation being able to be composed of another type of anionic surface-active agent with less advantageous ecotoxicological properties, such as $C_1$–$C_{18}$ alkylbenzenesulfonates.

Mention may be made, among the sulfates of optionally ethoxylated alcohols which can be employed, of the sulfates of nonethoxylated $C_8$–$C_{18}$ (preferably $C_{10}$–$C_{15}$) alcohols, the sulfates of $C_5$–$C_{13}$ (preferably $C_{10}$–$C_{13}$) fatty alcohols condensed with approximately 1 to 30 (preferably 1 to 10 mol) of ethylene oxide, or the sulfates of $C_{14}$–$C_{20}$ (preferably $C_{14}$–$C_{18}$) fatty alcohols condensed with approximately 4 to 30 mol (preferably 4 to 10 mol) of ethylene oxide.

In addition to the soil-release terephthalic polyester composition (TPC) of the invention, other additives of the type of those described below can be. present in the detergent formulations.

SURFACE-ACTIVE AGENTS, in amounts corresponding to approximately 3–40% by weight with respect to the detergent formulation, surface-active agents such as Anionic Surface-active Agents alkyl ester sulfonates of formula R—CH($SO_3$M)—COOR', where R represents a $C_8$–$C_{20}$, preferably $C_{10}$–$C_{136}$, alkyl radical, R' a $C_1$–$C_6$, preferably $C_1$–$C_3$, alkyl radical and M an alkali metal cation (sodium, potassium or lithium), a substituted or unsubstituted ammonium (methyl-, dimethyl-, trimethyl- or tetramethylammonium, dimethylpiperidinium, and the like) cation or a cation derived from an alkanolamine (monoethanolamine, diethanolamine, triethanolamine, and the like). Mention may very particularly be made of the methyl ester sulfonates for which the R radical is a $C_{14}$–$C_{16}$ radical;

alkyl ether sulfates of formula $ROSO_3M$, where R represents a $C_5$–$C_{24}$, preferably $C_{10}$–$C_{18}$, alkyl or hydroxyalkyl radical, M representing a hydrogen atom or a cation with the same definition as above, and their ethoxylenated (EO) and/or propoxylenated (PO) derivatives exhibiting an average of 0.5 to 30, preferably of 0.5 to 10, EO and/or PO units;

alkylamide sulfates of formula RCONHR'$OSO_3$M, where R represents a $C_2$–$C_{22}$, preferably $C_6$–$C_{20}$, alkyl radical, R' a $C_2$–$C_3$ alkyl radical, M representing a hydrogen atom or a cation with the same definition as above, and their ethoxylenated (EO) and/or propoxylenated (PO) derivatives exhibiting an average of 0.5 to 60 EO and/or PO units;

salts of saturated or unsaturated $C_8$–$C_{24}$, preferably $C_{14}$–$C_{20}$, fatty acids, $C_9$–$C_{20}$ alkylbenzenesulfonates, primary or secondary $C_8$–$C_{22}$ alkylsulfonates, alkylglycerol sulfonates, the sulfonated polycarboxylic acids disclosed in GB-A-1 082 179, paraffin sulfonates, N-acyl-N-alkyltaurates, alkyl phosphates, alkyl isethionates, alkylsuccinamates, alkylsulfosuccinates, the monoesters or diesters of sulfosuccinates, N-acylsarcosinates, alkylglycoside sulfates or polyethoxycarboxylates the cation being an alkali metal (sodium, potassium or lithium), a substituted or unsubstituted ammonium residue (methyl-, dimethyl-, trimethyl- or tetramethylammonium, dimethylpiperidinium, and the like) or a residue derived from an alkanolamine (monoethanolamine, diethanolamine, triethanolamine, and the like);

Nonionic Surface-active Agents polyoxyalkylenated (polyethoxyethylenated, polyoxypropylenated or polyoxybutylenated) alkylphenols, the alkyl substituent of which is $C_6$–$C_{12}$, comprising from 5 to 25 oxyalkylene units; mention may be made, by way of example, of Triton X-45, Triton X-114, Triton X-100 or Triton X-102, sold by Röhm & Haas Co.;

glucosamide or glucamide;

glycerolamides derived from N-alkylamines (U.S. Pat. No. 5,223,179 and FR-A-1 585 966);

polyoxyalkylenated $C_8$–$C_{22}$ aliphatic alcohols comprising from 1 to 25 oxyalkylene (oxyethylene or oxypropylene) units; mention may be made, by way of example, of Tergitol 15-S-9 or Tergitol 24-L-6 NMW, old by Union Carbide Corp., Neodol 45-9, Neodol 23-65, eodol 45-7 or Neodol 45-4, sold by Shell Chemical Co., or Kyro EOB, sold by The Procter & Gamble Co.;

the products resulting from the condensation of ethylene oxide with a hydrophobic compound resulting from the condensation of propylene oxide with propylene glycol, such as the Pluronics sold by BASF;

the products resulting from the condensation of ethylene oxide, the compound resulting from the condensation of propylene oxide with ethylenediamine, such as the Tetronics sold by BASF;

amine oxides, such as ($C_{10}$–$C_{18}$ alkyl)dimethylamine oxides or ($C_8$–$C_{22}$ alkoxy)ethyldihydroxyethylamine oxides;

the alkylpolyglycosides disclosed in U.S. Pat. No. 4,565,647;

$C_8$–$C_{20}$ fatty acid amides;

ethoxylated fatty acids;

ethoxylated fatty amides;

ethoxylated amines.

Cationic Surface-active Agents alkyldimethylammonium halides.

Amphoteric and Zwitterionic Surface-active Agents alkyl dimethyl betaines, alkyl amidopropyldimethyl betaines, alkyl trimethyl sulfobetaines, or the condensation products of fatty acids and of protein hydrolysates.

ADJUVANTS FOR IMPROVING THE PROPERTIES OF SURFACE-ACTIVE AGENTS (builders), in amounts corresponding to approximately 5–50%, preferably to approximately 5–30%, by weight for the liquid detergent formulae or to approximately 10–80%, preferably 15–50%, by weight for the powder detergent formulae, builders such as Inorganic Adjuvants (Builders)

alkali metal, ammonium or alkanolamine polyphosphates (tripolyphosphates, pyrophosphates, orthophosphates or hexametaphosphates);

tetraborates or borate precursors;

silicates, in particular those exhibiting an $SiO_2/Na_2O$ ratio of the order of 1.6/1 to 3.2/1, and the lamellar silicates disclosed in U.S. Pat. No. 4,664,839;

alkaline or alkaline earth carbonates (bicarbonates or sesquicarbonates);

cogranules of hydrated alkali metal silicates and of alkali metal carbonates (sodium carbonate or potassium carbonate) which are rich in silicon atoms in the Q2 or Q3 form, which are disclosed in EP-A-488 868;

crystalline or amorphous alkali metal (sodium or potassium) or ammonium aminosilicates, such as zeolites A, P, X, and the like; zeolite A with a particle size of the order of 0.1–10 micrometers is preferred.

Organic Adjuvants (Builders)

water-soluble polyphosphonates (ethane-1-hydroxy-1,1-diphosphonates, salts of methylenediphosphonates, and the like);

water-soluble salts of carboxyl polymers or copolymers or their water-soluble salts, such as:

polycarboxylate ethers (oxydisuccinic acid and its salts, tartrate monosuccinic acid and its salts, or tartrate disuccinic acid and its salts, hydroxypolycarboxylate ethers;

citric acid and its salts, mellitic acid or succinic acid and their salts;

salts of polyacetic acids (ethylenediaminetetraacetates, nitrilotriacetates or N-(2-hydroxyethyl) nitrilodiacetates);

($C_5$–$C_{20}$ alkyl)succinic acids and their salts (2-dodecenylsuccinates or laurylsuccinates);

polyacetal carboxylic esters;

polyaspartic acid, polyglutamic acid and their salts;

polyimides derived from the polycondensation of aspartic acid and/or of glutamic acid;

polycarboxymethylated derivatives of glutamic acid or of other amino acids.

BLEACHING AGENTS, in amounts of approximately 0.1–20%, preferably approximately 1–10%, by weight, optionally in combination with BLEACHING ACTIVATORS, in amounts of approximately 0.1–60%, preferably of approximately 0.5–40%, by weight, agents and activators such as Bleaching Agents perborates, such as sodium perborate monohydrate or tetrahydrate;

peroxygenated compounds, such as sodium carbonate peroxohydrate, pyrophosphate peroxohydrate, urea hydrogen peroxide, sodium peroxide or sodium persulfate;

preferably in combination with a bleaching activator generating in situ, in the detergent medium, a peroxycarboxylic acid; mention may be made, among these activators, of tetraacetylethylenediamine, tetraacetylmethylenediamine, tetraacetylglycoluryl, sodium p-acetoxybenzenesulfonate, pentaacetylglucose, octaacetyllactose, and the like;

percarboxylic acids and their salts (known as "percarbonates"), such as magnesium monoperoxyphthalate hexahydrate, magnesium meta-chloroperbenzoate, 4-nonylamino-4-oxoperoxybutyric acid, 6-nonylamino-6-oxoperoxycaproic acid, diperoxydodecanedioic acid, the nonylamide of peroxysuccinic acid, or decyldiperoxy-succinic acid.

These agents can be used in combination with at least one of the soil-release or antiredeposition agents mentioned hereinbelow.

Non-oxygenated bleaching agents, which act by photo-activation in the presence of oxygen, can also be mentioned, agents such as sulfonated zinc and/or aluminum phthalocyanines.

ANTIREDEPOSITION AGENTS, in amounts of approximately 0.01–10% by weight for a powder detergent composition and of approximately 0.01–5% by weight for a liquid detergent composition, agents such as:
  ethoxylated monoamines or polyamines, or polymers of ethoxylated amines (U.S. Pat. No. 4,597,898, EP-A-11 984);
  carboxymethylcellulose;
  sulfonated polyester oligomers obtained by condensation of isophthalic acid, of dimethyl sulfosuccinate and of diethylene glycol (FR-A-2 236 926);
  polyvinylpyrollidones;

iron- and magnesium-CHELATING AGENTS, in amounts of the order of 0.1–10%, preferably of the order of 0.1–3%, by weight, agents such as
  aminocarboxylates, such as ethylenediaminetetraacetates, hydroxyethylethylenediaminetriacetates or nitrilotriacetates;
  aminophosphonates, such as nitrilotris (methylenephosphonates);
  polyfunctional aromatic compounds, such as dihydroxydisulfobenzenes.

POLYMERIC DISPERSING AGENTS, in an amount of the order of 0.1–7% by weight, in order to control the calcium and magnesium hardness, agents such as:
  water-soluble salts of polycarboxylic acids with a molecular mass of the order of 2000 to 100000, obtained by polymerization or copolymerization of ethylenically unsaturated carboxylic acids, such as acrylic acid, maleic acid or anhydride, fumaric acid, itaconic acid, aconitic acid, mesaconic acid, citraconic acid or methylenemalonic acid, and very particularly polyacrylates with a molecular mass of the order of 2000 to 10000 (U.S. Pat. No. 3,308,067) or copolymers of arylic acid and of maleic anhydride with a molecular mass of the order of 5000 to 75000 (EP-A-66 915);
  poly(ethylene glycol)s with a molecular mass of the order of 1000 to 50000.

FLUORESCENCE AGENTS (BRIGHTENERS), in an amount of approximately 0.05–1.2% by weight, agents such as derivatives of stilbene, pyrazoline, coumarin, fumaric acid, cinnamic acid, azoles, methinecyanines, thiophenes, and the like ("The Production and Application of Fluorescent Brightening Agents", M. Zahradnik, published by John Wiley & Sons, New York, 1982).

FOAM-SUPPRESSANT AGENTS, in amounts which can range up to 5% by weight, agents such as:
  $C_1$–$C_{24}$ fatty monocarboxylic acids or their alkali metal, ammonium or alkanolamine salts, or fatty acid triglycerides;
  saturated or unsaturated, aliphatic, alicyclic, aromatic or heterocyclic hydrocarbons, such as paraffins or waxes;
  N-alkylaminotriazines;
  monostearyl phosphates or monostearyl alcohol phosphates;
  polyorganosiloxane oils or resins, optionally combined with silica particles.

SOFTENERS, in amounts of approximately 0.5–10% by weight, softeners such as clays.

ENZYMES, in an amount which can range up to 5 mg by eight, preferably of the order of 0.05–3 mg, of active enzyme/g of detergent composition, enzymes such as proteases, amylases, lipases, cellulases or peroxidases (U.S. Pat. Nos. 3,553,139, 4,101,457, 4,507,219 and 4,261,868).

OTHER ADDITIVES, such as:
  alcohols (methanol, ethanol, propanol, isopropanol, propanediol, ethylene glycol or glycerol);
  buffer agents;
  fragrances;
  pigments.

The following examples are given by way of illustration.

Characteristics of the Terephthalic Polyester Composition (TPC) Prepared

These are determined by:

1) Size exclusion chromatography (SEC), using a size exclusion chromatography device of Waters type equipped with two-fold detection (RI and UV) and equipped with 3 columns, using N,N-dimethyl-acetamide (DMAc) comprising 10–2 mol/l of LiBr as eluent at 100° C.

100 μl of a 1% by weight solution of polymer in the DMAc/LiBr mixture are injected.

The UV spectrum makes it possible:
  to detect the presence of the aromatic A (terephthalic) nuclei,
  to determine the percentage of ethylene terephthalate homooligomer ($PET_1$) in the terephthalic polyester composition (TPC),
    the signal of the ethylene terephthalate homooligomers ($PET_1$) appears between 1000 and 5000 (mass expressed in polystyrene equivalent);
    the signal of the block terephthalic copolymers ($PET_2$/TE-POE) appears between 5000 and 100000.
    The percentage of ethylene terephthalate homooligomer ($PET_1$) in the terephthalic polyester composition (TPC) is equal to the [area of the signal of the ethylene terephthalate homooligomers ($PET_1$)/total area of the signals] ratio×100 (see the spectra in FIGS. 1/2 and 2/2, corresponding respectively to the products of example 1 and of comparative example 2).
  to determine the weight-average molar mass of the block terephthalic copolymer ($PET_2$/TE-POE), expressed in polystyrene equivalents.

2) Proton nuclear magnetic resonance ($^1$H NMR), by dissolution under warm conditions of the samples to be analyzed in a CDCl3/deuterated hexafluoroisopropanole/deuterated trifluoroacetic anhydride mixture. The NMR analysis is subsequently carried out at ambient temperature on a Brucker spectrometer at 300 MHz. The chemical shifts are expressed with respect to hexamethylenedisiloxane.

The chemical shifts corresponding to
  aromatic (terephthalic T) nuclei,
  oxyethylene units,
  mono(oxyethyleneoxy) (OEO) residues present in the oxyethylene aromatic diester (OAD) groups, polyoxyethylene terephthalate blocks (TE-POE), units at the end of chains, are given in the table below.

| Chemical shifts in ppm | Groups | |
|---|---|---|
| 8.03 | T | 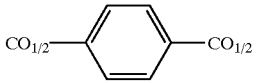 $CO_{1/2}$—⌬—$CO_{1/2}$ |
| 4.68 | OEO in OAD | Ph—CO—O—$CH_2$—$CH_2$—O—CO—Ph |
| 4.47 | TE—POE | Ph—CO—O—$CH_2$—$CH_2$—O—PEG |
| 4.04 | End of chains | Ph—CO—O—$CH_2$—$CH_2$—OH |
| 3.88 | End of chains | PEG—O—$CH_2$—$CH_2$—OH |
| 3.65 | Oxyethylene | PEG—O—$CH_2$—$CH_2$—O—PEG |

The molar percentage of each species is subsequently estimated from the integral of the protons of each type of unit and then the percentages by mass are deduced therefrom. A working example is given in the following table with reference to the spectrum corresponding to the product of example 1.

The concentration by mass of $[PET_1]+[PET_2/TE\text{-}POE]\%$ w/w (i.e. 12.2% w/w) and the concentration by mass of the PhC(O)—O—$CH_2$—$CH_2$—O—C(O)—Ph units (i.e. 1.37% w/w) are obtained.

| product of example 1 | molar masses of the units | Integrals read on the proton spectrum | molar % | % by mass |
|---|---|---|---|---|
| $O_{1/2}$-CO-Ph-CO-$O_{1/2}$ | 148 | 1 | 2.95 | 9.21* |
| Ph-CO-$O_{1/2}$-$O_{1/2}CH_2$-$CH_2$-$O_{1/2}$-$O_{1/2}$-CO-Ph | 44 | 0.5 | 1.48 | 1.37 |
| Ph-CO-$O_{1/2}$-$O_{1/2}CH_2$-$CH_2$-$O_{1/2}$-$O_{1/2}$-PEG | 44 | 0.915 | 2.70 | 2.50 |
| PEG-$O_{1/2}$-$O_{1/2}CH_2$-$CH_2$-$O_{1/2}$-$O_{1/2}$-PEG | 44 | 30.155 | 88.97 | 82.55 |
| PEG-$O_{1/2}$-$O_{1/2}CH_2$-$CH_2$-OH | 53 | 1.28 | 3.78 | 4.22 |
| Ph-CO-$O_{1/2}$-$O_{1/2}CH_2$-$CH_2$-OH | 53 | 0.045 | 0.13 | 0.15 |
| | | 33.895 | | 100 |

*The content of TE with respect to $[PET_1] + [PET_2/TE\text{-}POE]$, that is to say with respect to (TPC), is calculated from this value.

Soil-release Properties
Detergent formula employed:

| Detergent composition | parts by weight |
|---|---|
| zeolite 4A | 25 |
| light carbonate | 15 |
| disilicate R2A | 5 |
| acrylic/maleic copolymer Sokalan CP5 (BASF) | 5 |
| Na sulfate | 10.7 |
| carboxymethylcellulose | 1 |
| perborate monohydrate | 15 |
| tetraacetylethylenediamine | 5 |
| linear dodecylbenzenesulfonate | 6 |
| Synperonic A3 ($C_{12}$-$C_{15}$ fatty alcohol ethoxylated with 3 EO) | 3 |
| Synperonic A9 ($C_{12}$-$C_{15}$ fatty alcohol ethoxylated with 9 EO) | 9 |
| enzyme Esperase 4.0 T | 0.3 |
| soil-release agent | |

Test
Prewashing

Squares lacking harshness, with dimensions of 10×10 cm, of polyester Style 777 100% Dacron Type 54 (Disperse Dyeable), manufactured by Touzart and Matignon, and of polyester/cotton (67/33), manufactured by CFT (Center For Test materials),. are prewashed in a Tergotometer for 20 min at 40° C. with the detergent formula comprising 0.5% by weight of active material of soil-release polymer tested; the water used exhibits a hardness of 30° HT; the amount of detergent employed is 5 g per 1 l of water.

The squares of fabrics are subsequently rinsed 3 times for 5 min in cold water (14° C.) and then dried by two passes under a glazing machine.

Staining 4 drops of dirty motor oil (DMO) are deposited on the prewashed test specimens.

In order to ensure that the stains are firmly attached, the fabrics are placed in an oven at 60° C. for 1 hour.

In order to make possible good reproducibility of the results, the fabrics are washed within 24 hours.

Washing

The washing is carried out under the same conditions as the prewashing (at 40° C. for 20 min, using 5 g of detergent comprising 1% of active material of soil-release polymer per 1 l of water of 30° HT, then 3 rinsings of 5 min in cold water and 2 drying operations under a glazing machine).

Evaluation

The reflectance of the fabrics before and after washing is measured using the Dr. Lange/Luci 100 calorimeter.

The effectiveness as soil-release agent of the polymer tested is assessed by the % of removal of the stains, calculated by the formula:

$$E \text{ in } \% = 100 \times (R3-R2)/(R1-R2)$$

R1 representing the reflectance, before washing, of the unsoiled fabric;

R2 representing the reflectance, before washing, of the soiled fabric;

R3 representing the reflectance, after washing, of the soiled fabric.

The mean of the % of removal of the stains is calculated for each product tested.

EXAMPLE 1

The various operations which follow are carried out in a stainless-steel reactor with a capacity of 1 l equipped with a stirrer of the helical ribbon type, with a jacket for the circulation of a heat-transfer fluid and with a distillation column:

1) 530 g of polyoxyethylene glycol with a molar mass of 3350 are introduced at ambient temperature; the temperature is increased; when the latter reaches 130° C., 72.3 g (i.e. 12% by weight with respect to the mixture) of polyethylene terephthalate Cleartuf 7202C from Shell, with a molar mass of 55000, and 0.37 g of magnesium oxide are added.

2) The temperature of the mixture is maintained at 130° C. for 5 min and the mixture is subjected to several. degassings (placing under a slight excess nitrogen pressure, followed by placing under vacuum), following which a nitrogen headspace is retained and the temperature of the reaction mass is gradually increased to 272° C. over 3 h and 30 min.

3) The pressure in the reactor is then rapidly reduced to 66661 Pa (500 mm of Hg) and maintained at this value for 20 min, during which the temperature of the reaction mass is gradually brought to 284° C.

4) The pressure is subsequently further reduced to reach 200 Pa (1.5 mm of Hg) over approximately 1 h. These conditions are maintained for 1 h and the polymer formed is recovered.

The characteristics of the polymer obtained, defined by gel exclusion chromatography and by proton nuclear magnetic resonance, are given in table 1.

Comparative Example 2

The operations described in stages 1) to 3) of example 1 are repeated. The reaction mixture is subsequently maintained [operation 4')] for 2 h and 30 min at 284° C. under 66661 Pa (500 mm of Hg).

The characteristics of the polymer obtained, defined by gel exclusion chromatography and by proton nuclear magnetic resonance, are given in table 1.

EXAMPLE 3

The operations 1) to 4) of example 1 are repeated, starting from the following charges:

530 g of polyoxyethylene glycol with a molar mass of 3 350

87.5 g of polyethylene terephthalate (i.e. 14% by weight) with a molar mass of 55 000.

The characteristics of the polymer obtained, defined by gel exclusion chromatography and by proton nuclear magnetic resonance, are given in table 1.

Comparative Example 4

The operations 1) to 4') of example 1 are repeated, starting from the following charges:

530 g of polyoxyethylene glycol with a molar mass of 3350

87.5 g of polyethylene terephthalate (i.e. 14% by weight) with a molar mass of 55000.

The characteristics of the polymer obtained, defined by gel exclusion chromatography and by proton nuclear magnetic resonance, are given in table 1.

EXAMPLE 5

The operations 1) to 4) of example 1 are repeated, starting from the following charges:

512.5 g of polyoxyethylene glycol with a molar mass of 3350

105 g of polyethylene terephthalate (i.e. 17% by weight) with a molar mass of 55 000.

The characteristics of the polymer obtained, defined by gel exclusion chromatography and by proton nuclear magnetic resonance, are given in table 1.

Comparative Example 6

The operations 1) to 4') of example 2 are repeated, starting from the following charges:

512.5 g of polyoxyethylene glycol with a molar mass of 3350

105 g of polyethylene terephthalate (i.e. 17% by weight) with a molar mass of 55000.

The characteristics of the polymer obtained, defined by gel exclusion chromatography and by proton nuclear magnetic resonance, are given in table 1.

Comparative Example 7

The operations 1) to 4') of example 2 are repeated, starting from the following charges:

500.2 g of polyoxyethylene glycol with a molar mass of 3 350

117.3 g of polyethylene terephthalate (i.e. 19% by weight) with a molar mass of 55000.

The characteristics of the polymer obtained, defined by-gel exclusion chromatography and by proton nuclear magnetic resonance, are given in table 1.

| Product of example | SEC chromatography data | | $^1$H NMR data | | Removal of the stains % |
|---|---|---|---|---|---|
| | Content of oligomer * | Molar mass Mw ** | TE % *** | PhCOOCH$_2$ CH$_2$OCOPh structures **** | |
| 1 | 5 | 47 700 | 11.9 | 1.37 | 75 |
| 2, comparative | 14 | 19 487 | 11.7 | 0.95 | 63 |
| 3 | 6 | 41 000 | 13.3 | 1.53 | 73 |
| 4, comparative | 21 | 13 100 | 13 | 1.35 | 70 |
| 5 | 5 | 54 200 | 16.2 | 1.83 | 71 |
| 6, comparative | 22 | 17 900 | 16.2 | 2.02 | 69 |
| 7, comparative | 25 | 16 800 | 17.3 | 2.31 | 64 |

*amount of (TE) units of (PET$_1$) with respect to all the (TE) units present in (TPC).
***weight of (TE) units as % with respect to the total weight of (TPC)
****Ph: 2,4-phenylene

What is claimed is:

1. A terephthalic polyester composition (TPC), comprising, as a mixture a polyethylene terephthalate homooligomer (PET$_1$) consisting essentially of oxyethylene terephthalate (TE) repeat units of formula (I):

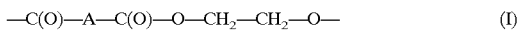   (I)

wherein A represents the 1,4-phenylene group, and a block terephthalic copolymer (PET$_2$/TE-POE) comprising:

at least one polyethylene terephthalate block (PET$_2$) composed of oxyethylene terephthalate (TE) repeat units of formula (I)

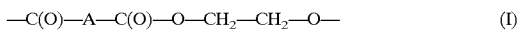   (I)

wherein A represents the 1,4-phenylene group, and at least one polyoxyethylene terephthalate block (TE-POE) of formula:

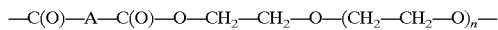

all the (TE) units present in said (TPC) composition represent at least 11% by weight of the weight of said (TPC) composition, said (TPC) composition presenting mono (oxyethyleneoxy) (OEO) residues of formula:

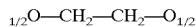

said (OEO) residues belonging to the oxyethylene aromatic diester (OAD) groups of formula:

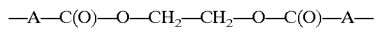

present in all the $(PET_1)$ and $(PET_2)$ blocks, and wherein the value of n of the polyoxyethylene terephthalate block (TE-POE) of formula:

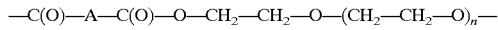

is such that said block exhibits a number-average molecular mass of 3 000 to 4 000, the (TE) units of the polyethylene terephthalate $(PET_1)$ does not represent more than 7% by weight of all the (TE) units present in the terephthalic polyester composition (TPC), all the (TE) units present in said (TPC) composition represent from 11.5 to 17% by weight, of the weight of said (TPC) composition, the mono(oxyethyleneoxy) (OEO) residues of formula:

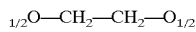

represents from 1.3 to 2.3% by weight, of the weight of said terephthalic polyester composition (TPC), and the weight-average molar mass of said block terephthalic copolymer $(PET_2/TE-POE)$ is at least 40 000.

2. A composition as claimed in claim 1, wherein the ends of the chains of homooligomers $(PET_1)$ are composed of —C(O)—A—C(O)—O—CH$_2$—CH$_2$—OH units.

3. A composition as claimed in claim 1, wherein the ends of the chains of block terephthalic copolymer $(PET_2/TE-POE)$ are composed of

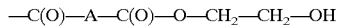

units or

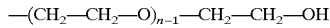

units.

4. A process for the preparation of a composition as defined in claim 1, comprising the steps of:

a) carrying out a transesterification/condensation reaction of a reaction mixture comprising a polyethylene terephthalate with a weight-average molecular mass of 3000 to 4000 and a polyethylene glycol with a number-average molecular mass of 1 500 to 4 000, according to a polyethylene terephthalate/(polyethylene terephthalate+polyethylene glycol) ratio by mass of 11.5/100 to 17/100, and adding the polyethylene terephthalate to the molten polyethylene glycol, then b) heating the reaction mixture under an inert atmosphere to a temperature of 100 to 150° C., and adding a catalytic effective amount of magnesium oxide to the reaction mixture, c) bringing the temperature of the mixture to a temperature of 250 to 290° C., and d) subsequently gradually placing said reaction mixture under vacuum to a pressure of less than 70 000 Pa, while optionally adjusting the temperature of said mixture to a value of 250 to 290° C.

5. A process according to claim 4, wherein:

in step a) the weight-average molecular mass of the polyethylene terephthalate is from 10 000 to 80 000, and the number-average molecular mass of the polyethylene glycol is from 3 000 to 4 000, the polyethylene terephthalate/(polyethylene terephthalate+polyethylene glycol) ratio by mass is from 11.5/100 to 17/100, in step b) the reaction mixture is heated to a temperature of 120 to 130° C., and in step c) the temperature of the mixture is brought to a temperature of 270 to 285° C., and, in step d), the pressure is between 7 000 to 130 Pa, while optionally adjusting the temperature of said mixture to a value of 270 to 285° C.

6. The process according to claim 4, wherein the amounts of magnesium oxide is from 20 to 500 ppm.

7. The process according to claim 6, wherein the amounts of magnesium oxide is from 100 to 350 ppm.

8. The process according to claim 4, wherein the reaction mixture further comprises an alkali metal organic salt.

9. The process according to claim 8, wherein the alkali metal organic salt is sodium acetate.

10. The process according to claim 8, wherein said salt is present according to an amount of 20 to 500 ppm.

11. The process according to claim 10, wherein the amount is of 100 to 350 ppm.

12. A process for washing, rinsing, softening or finishing textiles comprising treating said textiles with a detergent formulation comprising a composition as defined in claim 1 used as a soil-release agent.

13. A process according to claim 12, wherein said textiles are polyester-based textiles.

14. A process according to claim 12, wherein said formulation comprises from 0.01 to 10% of said composition with respect to the weight of said detergent formulation.

15. A process according to claim 14, wherein said formulation comprises from 0.2 to 3% of said composition.

16. A detergent formulation comprising 0.01 to 10% of a composition as defined in claim 1 with respect to the weight of said detergent formulation.

17. A detergent formulation comprising 0.2 to 3% of a composition as defined in claim 1.

* * * * *